United States Patent Office 3,376,267
Patented Apr. 2, 1968

3,376,267
MELTABLE 1,3,4-POLYOXADIAZOLES AND
THEIR PREPARATION
Gerfried Pruckmayr, Wilmington, Del., assignor to E. I.
du Pont de Nemours and Company, Wilmington, Del.,
a corporation of Delaware
No Drawing. Filed Dec. 3, 1964, Ser. No. 415,813
8 Claims. (Cl. 260—78)

ABSTRACT OF THE DISCLOSURE

Meltable low molecular weight polyoxadiazoles useful in bonding metals are prepared by heating aromatic tri- or di-esters with aromatic di- or tri-hydrazides respectively.

---

The preparation of organic compounds which are commercially useful as thermally-stable metal adhesives has been a long recognized goal of practitioners in the art. In the manufacture of super-sonic aircraft, for example, conventional riveting and welding are often unacceptable for joining the outer surface metal sheeting onto the internal supporting members. Thus, it is desired to provide an organic material to adhere such components together. The requirements for such an organic compound metal adhesive are inherently demanding. The compound must provide very tenacious metal bonds in order that the adhered joints can withstand severe stresses and strains. Moreover, such bonds must be retained at the very high temperatures which are attained on the surfaces of these aircraft; therefore, the compound must possess thermal and chemical stability.

Several high molecular weight organic polymers have been prepared which possess thermal stability. However, most of these polymers do not function properly as metal adhesives. For example, 1,3,4-polyoxadiazoles having the recurring structural unit:

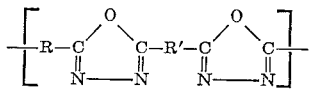

wherein R and R' are divalent organic aromatic or aliphatic radicals, are known to possess excellent thermal and chemical stability. However, as discussed further hereinafter, the 1,3,4-polyoxadiazoles prepared heretofore have been totally unacceptable for use as metal adhesives.

The 1,3,4-polyoxadiazoles of the prior art have been used primarily as self-supporting films and fibers where thermal and chemical stability are desired properties. Because of these thermal and chemical stability properties, it is extremely difficult to shape these 1,3,4-polyoxadiazoles into film, fibers and the like. Therefore, it has been common practice to first prepare a 1,3,4-polyoxadiazole precursor which can be formed into a film or fiber, as desired, and then convert the precursor into the 1,3,4-polyoxadiazole. The precursors used heretofore for such purposes are high molecular weight polyhydrazides having the recurring structural unit:

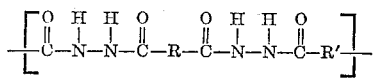

wherein R and R' are divalent organic aromatic or aliphatic radicals.

The prior art teaches various ways by which these polyhydrazides may be produced, via solution reactions. For example, such polyhydrazides are produced by heating a solvent solution of a diacyl chloride having the formula:

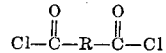

and a dihydrazide of the formula:

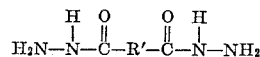

wherein R and R' are divalent organic aromatic or aliphatic radicals. Similarly, these polyhydrazides may also be prepared by heating a solvent solution of a dicarboxylic acid, acid ester, or anhydride with a dihydrazide of the formula indicated immediately above.

These polyhydrazides prepared heretofore having the recurring structural unit:

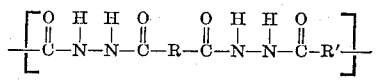

wherein both R and R' are divalent aromatic radicals, inherently are linear high molecular weight, polymers which either are not meltable or are melted only with great difficulty. On exposure to heat, instead of melting they are normally converted directly into the 1,3,4-polyoxadiazole. Consequently, these materials, which are termed "all aromatic" linear polyhydrazides, cannot be used in hot-melt applications. Introduction of aliphatic radicals into the structure usually results in a lower molecular weight, and meltable, linear polyhydrazides. However, the linear polyoxadiazoles obtained from the thermal conversion of these prior art linear polyhydrazides provide bond strengths to metal which are far below normal commercial specifications, and thus, are totally unacceptable as metal adhesives.

It is an object of this invention to provide an improved organic compound metal adhesive. Another object is to provide an improved polyhydrazide. A further object is to provide an improved, meltable, low molecular weight polyhydrazide which may be thermally converted to thermally-stable 1,3,4-polyoxadiazoles which are especially suitable for use as metal adhesives.

These and other objects are attained by the present invention which provides a polyhydrazide having the recurring unit:

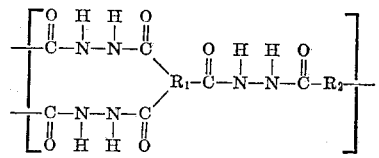

wherein $R_1$ is a trivalent aromatic radical and $R_2$ is a divalent aromatic radical, said polyhydrazide being meltable and having an inherent viscosity of less than 0.2.

The polyhydrazides of this invention are prepared by heating a mixture of a particular aromatic or heterocyclic ester with a certain hydrazide to obtain a melt, and then controllably heating this molten mixture until the polyhydrazide is obtained. The class of esters used in this invention are triesters of the formula:

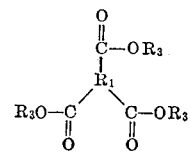

and diesters of the formula:

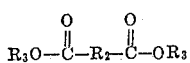

The hydrazides used in this invention are trihydrazides characterized by the formula:

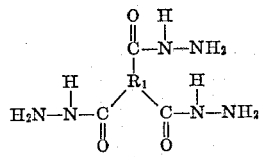

and the dihydrazides having the formula:

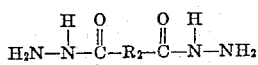

In these formulae, each $R_1$ represents a trivalent aromatic carboxylic or heterocyclic radical such as

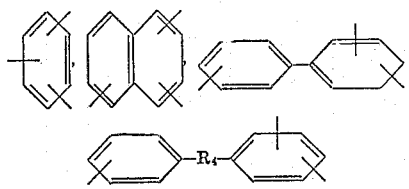

wherein $R_4$ is a divalent radical or element such as

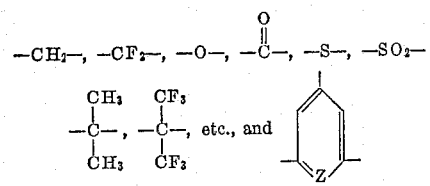

wherein X represents nitrogen, sulfur or the like. Each $R_2$ is a divalent aromatic carbocyclic or heterocyclic radical such as phenylene, naphthylene, biphenylene, anthrylene, furylene, benzfurylene, and

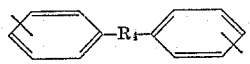

wherein $R_4$ is a divalent radical or element as described above, and the like. Each $R_3$ represents an aryl radical such as phenyl, biphenyl, napthyl, cresyl, dichlorophenyl, etc., or an alkyl radical such as methyl, ethyl, butyl, etc. Preferably, each $R_1$ and $R_2$ is an aromatic radical, and $R_3$ is phenyl.

More than one type of ester and more than one type of hydrazide may be used in the practice of this invention. However, it is critical that the ester and hydrazide be selected so that the mixture contains either the trifunctional ester,

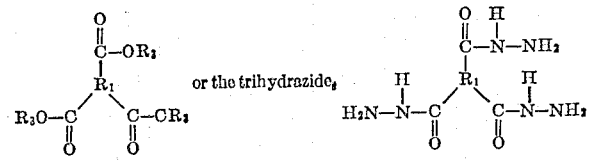

More than one type of ester and more than one type of hydrazide may be used in the practice of this invention. However, it is critical that the reaction mixture contain either a preponderant proportion of triester and dihydrazide or a preponderant proportion of diester and trihydrazide. The peferable reaction is between the triester and dihydrazide. Although the reaction between the diester and trihydrazide theoretically gives the same product as does the reaction between the triester and dihydrazide, unexplainably it has been discovered that the former reaction often yields a product which either is not meltable or has an undesirably high melting point, and which is only difficulty soluble in most solvents. Also, it would be expected that a polyhydrazide having the formula:

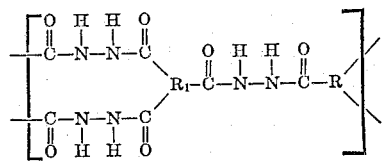

which is produced by the reaction between a triester and a trihydrazide, would have similar properties to the polyhydrazides of this invention. However, contrary to expectations, the polyhydrazide of a triester and a trihydrazide is not meltable, not solvent soluble, and thus, is completely outside the scope of the present invention.

The ester and hydraxide are reacted in a mole ratio of hydrazide to ester of from about 0.9:1 to about 1.5:1, or preferably from 1:1 to 1.2:1. After the starting materials have melted, the heating of the molten mixture is continued, normally at a temperature of about 200–300° C. The heating is discontinued before the inherent viscosity of the resulting polyhydrazide exceeds 0.2, measured as a 0.5% solution in any suitable solvent at 30° C., according to the procedure specified in ASTM D–1601. Preferably, the heating is discontinued when the inherent viscosity of the polyhydrazide reaches 0.04 to 0.12. The cooled product is obtained in the form of a solid material which may be subsequently used as a finely-divided powder.

The polyhydrazides of this invention are low molecular weight materials. As indicated above, the molecular weight corresponds to an inherent viscosity of less than 0.2. The highest ultimate bond strengths are obtained from polyhydrazides having inherent viscosities within the range of about 0.04 to 0.12. While the products of this invention are termed "polyhydrazides" these products are not to be confused with the long chained molecules usually associated with polymers. Here, the prefix "poly" denotes a plurality, but limited number, of recurring units. These polyhydrazides are usually mixtures of molecules each having from 1 to 10 or more recurring units, with most having from 2 to 5 recurring units.

The polyhydrazides of this invention are meltable. That is, they have definite, although not necesarily sharp, melting points. Usually the melting points are from about 50° to about 200° C. Maximum utility and highest utlimate bond strengths are obtained from polyhydrazides having melting points of 100 to 150° C. Of particular importance is the fact that these polyhydrazides remain stable for considerable lengths of time in the molten state without degradation or conversion to 1,3,4-polyoxadiazoles.

The polyhydrazides of this invention may be converted into crosslinked 1,3,4-polyoxadiazoles having the recurring unit:

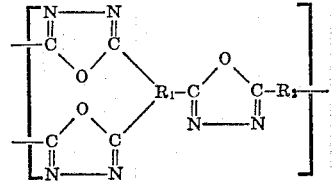

wherein $R_1$ represents a trivalent aromatic carbocyclic or heterocyclic radical, and $R_2$ represents a divalent aromatic carbocyclic or heterocyclic radical, by subjecting the polyhydrazides to elevated temperatures, on the order of 300° C. These crosslinked 1,3,4-polyoxadiazoles are high molecular weight, thermally and chemically stable polymers which form very tenacious bonds with various metals.

As indicated above, the polyhydrazides of the prior art having the recurring unit:

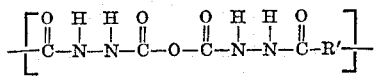

wherein R and R' represent divalent aromatic or aliphatic radicals are not useful in metal adhesive applications. However, the polyhydrazides of this invention are especially useful as metal adhesives. These polyhydrazides lead to tenacious bonds on a wide variety of metals such as copper, brass, aluminum, titanium, molybdenum, and steel, including the various stainless steels which are normally considered to be very difficult to bond together with organic adhesives. These polyhydrazides may be used alone or in admixture with metal particle fillers, such as aluminum or zinc dust, and the like. Where the surfaces to be adhered together are in a horizontal plane, the polyhydrazides may be used as finely-divided powder, by sprinkling the powder onto one of the surfaces, and bringing the second surface into contact therewith. Then, the laminate is subjected to heat treatment to first melt the polyhydrazide which melts and flows to completely fill the joint between the two surfaces, and thereafter to convert the polyhydrazide into the 1,3,4-polyoxadiazole. Alternately, these polyhydrazides may be first melted and then used in accordance with familiar hot melt techniques. Also, if desired, these polyhydrazides may be dissolved in a suitable solvent to prepare a solution, or may be blended with a sufficient amount of solvent to form a paste or dough which may be conveniently applied to the surfaces to be adhered. Suitable solvents for the polyhydrazides of this invention include dimethylformamide, dimethylacetamide, N-methylpyrrolidone, dimethylsulfoxide, hexamethylphosphoramide, and the like. An adhesive tape may be prepared by impregnating a glass fiber cloth, or the like, with a paste of the polyhydrazide, and thereafter removing the solvent by air-drying. This tape then may be used as a heat-sensitive adhesive. After the polyhydrazides of this invention have been applied to the metal surfaces, and converted to the 1,3,4-polyoxadiazole, very strong bonds are formed which possess remarkable thermal and chemical resistance.

These polyhydrazides may also be used in the same manner as any of the conventional polyhydrazides of the art. Whereas the wholly aromatic polyhydrazides of the prior art are not meltable, or melt only with great difficulty, the polyhydrazides of this invention are meltable, and thus, possess even more utility. When melted, these polyhydrazides become very fluid, and may be easily flowed onto surfaces, into crevasses, molds, forms, and the like, thus permitting applications not possible with the wholly aromatic polyhydrazides of the art.

The polyhydrazides of this invention may be shaped into useful articles of manufacture such as films, tubes, rods, and the like, and then converted into the 1,3,4-polyoxadiazole. If desired, inert materials may be added before or after shaping. Such fillers include pigments, electrically conductive carbon black, metal particles, abrasives, dielectrics, and lubricating polymers. Cellular products, such as foams, may be produced by the use of conventional blowing agents, or by dispersing bubbles of a suitable gas, such as air, carbon dioxide, nitrogen, etc. into a melt or solution of these polyhydrazides.

The polyhydrazides of this invention are also useful as coating compositions. Such compositions may be used as hot melts or as solutions of the polyhydrazides in a suitable solvent. The usual techniques of application such as brushing, spraying, rolling, dipping, doctoring, and the like, may be used to apply such coating compositions onto a wide variety of substrates including steel, aluminum, copper, brass, and other metals in the form of sheets, fibers, wires, screening; mineral structures such as asbestos; glass in the form of sheets, fibers, foams, fabrics, and the like; polymeric materials such as cellulosics, polyolefins, polyesters, polyamides, polyimidies, polyfluorocarbons, polyurethanes in the form of sheets, fibers, fabrics, screening, etc.; leather sheets and the like.

The invention is further illustrated by the following examples:

EXAMPLE 1

This example shows the preparation of one of the preferred polyhydrazides of this invention. A dry powdered mixture of 2.92 grams of triphenyltrimesate and 1.94 grams of isophthallyldihydrazide was mixed thoroughly in a mortar, and then charged to a small resin kettle. The resin kettle was immersed into an oil bath which was preheated to 260° C. The powdered mixture melted, and the molten mixture was stirred to prevent separation into two layers. A slow stream of nitrogen was passed through the resin kettle during the entire reaction time. Phenol was evolved during this heating cycle. The two layers gradually became miscible, and the melt viscosity increased. After 10 minutes, the resin kettle was removed from the oil bath and cooled to room temperature. The resulting molten polyhydrazide solidified, and then was ground to a white powder. The softening point of this polyhydrazide was 160–170° C. The inherent viscosity was 0.08, as measured at 30° C. in a 0.5% dimethyl acetamide solution.

EXAMPLE 2

This example illustrates the use of the polyhydrazides of this invention as metal adhesives. Strips of stainless steel, 1 inch x 3 inches, were prepared by the procedure described as Method I by Guttman, Concise Guide to Structural Adhesives, Reinhold Publishing Corp., New York (1961), p. 21. The powdered product of Example 1 was applied to about a ½ inch segment of the end of the strip. Another strip was brought into contact therewith to provide a 0.5 inch overlap. This assembly was heated to about 300° C. for 2 hours under a constant pressure of 200 p.s.i. which converted the polyhydrazide into the corresponding 1,3,4-polyoxadiazole. The shear strength of the bond was 3200 p.s.i. at room temperature and 2300 p.s.i. at 300° C., as determined by the test procedure described in ASTM D–1002.

EXAMPLE 3

A dry powdered mixture of 4.38 grams of triphenyltrimesate and 2.29 grams of the dihydrazide of p,p'-diphenyloxide dicarboxylic acid was prepared and reacted in a resin kettle as shown in Example 1. The oil bath temperature was maintained at 250° C. After 5 minutes, the resin kettle was removed from the oil bath and cooled to room temperature. The resulting molten polyhydrazide solidified, and then was ground to a white powder. The softening point of this polyhydrazide was 160° C., and the inherent viscosity was 0.09, measured as described in Example 1. The lap shear strength at room temperature was 2200 p.s.i., determined as shown in Example 2.

EXAMPLE 4

A dry powdered mixture of 4.38 grams of triphenyltrimesate, 3.18 grams of diphenylisophthalate, and 6.85 grams of isophthallyl dihydrazide was prepared, reacted and the resulting polyhydrazide ground to a powder as shown in Example 1. The softening point of this polyhydrazide was 100° C., and the inherent viscosity was 0.04, measured as described in Example 1. The lap shear strength at room temperature was 1500 p.s.i., determined as shown in Example 2.

EXAMPLE 5

This example shows the preparation of a linear polyhydrazide of the prior art. A dry powdered mixture of 1.59 grams of diphenylisophthalate and 0.97 gram of isophthaloyldihydrazide was prepared and reacted in a resin kettle as described in Example 1. After 8 minutes, the resin kettle was removed from the oil bath. The resulting molten polyhydrazide was cooled to room temperature and ground to a white powder. The softening point of this polyhydrazide was 140° C., and the inherent viscosity was 0.06, measured as shown in Example 1. The lap shear strength at room temperature was only 400

I claim:

1. A polyhydrazide consisting essentially of recurring units of the general formula $$\left[ \begin{array}{c} O\ H\ H\ O \\ \|\ |\ |\ \| \\ -C-N-N-C \\ \\ -C-N-N-C \\ \|\ |\ |\ \| \\ O\ H\ H\ O \end{array} R_1 \begin{array}{c} O\ H\ H\ O \\ \|\ |\ |\ \| \\ -C-N-N-C-R_2- \end{array} \right]$$

wherein:
$R_1$ is a trivalent aromatic radical and
$R_2$ is a divalent aromatic radical, said polyhydrazide being meltable and having an inherent viscosity of up to 0.2 as determined at 0.5 g./deciliter in dimethyl acetamide at 30° C.

2. The polyhydrazide of claim 1 having a melting point of 50 to 200° C. and an inherent viscosity of 0.04 to 0.12.

3. A polyhydrazide consisting essentially of receiving units of the general formula $$\left[ \begin{array}{c} O\ H\ H\ O \\ \|\ |\ |\ \| \\ -C-N-N-C \\ \\ -C-N-N-C \\ \|\ |\ |\ \| \\ O\ H\ H\ O \end{array} R_1 \begin{array}{c} O\ H\ H\ O \\ \|\ |\ |\ \| \\ -C-N-N-C-R_2- \end{array} \right]$$

wherein:
$R_1$ is a trivalent aromatic carbocyclic radical, and
$R_2$ is a divalent aromatic carbocyclic radical, said polyhydrazide being meltable and having an inherent viscosity of less than 0.2 as determined at 0.5 g./deciliter in dimethyl acetamide at 30° C.

4. The polyhydrazide of claim 3 having a melting point of 50 to 200° C. and an inherent viscosity of 0.4 to 0.12.

5. The process for preparing a meltable polyoxadiazole-precursor comprising heating a molten mixture selected from the group consisting of (a) a triester of the formula $$\begin{array}{c} O \\ \| \\ C=OR_3 \\ | \\ R_1 \\ R_3O-C \quad C-OR_3 \\ \| \quad\quad \| \\ O \quad\quad O \end{array}$$

with a dihydrazide of the formula $$\begin{array}{c} H\ O \quad\quad O\ H \\ |\ \| \quad\quad \|\ | \\ H_2N-N-C-R_2-C-N-NH_2 \end{array}$$

(b) a diester of the formula $$\begin{array}{c} O \quad\quad O \\ \| \quad\quad \| \\ R_3O-C-R_2-C-OR_3 \end{array}$$

with a trihydrazide of the formula $$\begin{array}{c} O\ H \\ \| \ | \\ C-N-NH_2 \\ | \\ H \quad R_1 \quad H \\ | \quad\quad\quad | \\ H_2N-N-C \quad C-N-NH_2 \\ \| \quad\quad \| \\ O \quad\quad O \end{array}$$

wherein the above formulae:
each $R_1$ is a trivalent aromatic radical,
each $R_2$ is a divalent aromatic radical, and
each $R_3$ is a member of the group consisting of aryl and alkyl radicals, and then discontinuing heating said molten mixture before the inherent viscosity of the resulting product exceeds 0.2 as determined at 0.5 g./deciliter in dimethyl acetamide at 30° C.

6. The process of claim 5 wherein the said heating is discontinued when the inherent viscosity of the resulting product reaches 0.04–0.12.

7. The process for preparing a meltable polyoxadiazole-precursor comprising heating a molten mixture of a triester of the formula $$\begin{array}{c} O \\ \| \\ C-OR_3 \\ | \\ R_1 \\ R_3O-C \quad C-OR_3 \\ \| \quad\quad \| \\ O \quad\quad O \end{array}$$

with a dihydrazide of the formula $$\begin{array}{c} H\ O \quad\quad O\ H \\ |\ \| \quad\quad \|\ | \\ H_2N-N-C-R_2-C-N-NH_2 \end{array}$$

wherein the above formulae, $R_1$ is a trivalent aromatic carbocyclic radical, $R_2$ is a divalent aromatic carbocyclic radical, and each $R_3$ is an aryl radical, and then discontinuing heating said molten mixture before the inherent viscosity of the resulting product exceeds 0.2 as determined at 0.5 g./deciliter in dimethyl acetamide at 30° C.

8. The process of claim 7 wherein the said heating is discontinued when the inherent viscosity of the resulting product reaches 0.04–0.12.

References Cited
UNITED STATES PATENTS

| | | | |
|---|---|---|---|
| 2,615,862 | 10/1952 | McFarlane et al. | 260—78 |
| 3,044,994 | 7/1962 | Blomstron | 260—78 |
| 3,130,182 | 4/1964 | Frazer | 260—78 |
| 3,130,183 | 4/1964 | Frazer | 260—78 |

WILLIAM H. SHORT, *Primary Examiner.*

SAMUEL H. BLECH, *Examiner.*

H. D. ANDERSON, *Assistant Examiner.*

UNITED STATES PATENT OFFICE
CERTIFICATE OF CORRECTION

Patent No. 3,376,267                      April 2, 1968

Gerfried Pruckmayr

It is certified that error appears in the above identified patent and that said Letters Patent are hereby corrected as shown below:

Column 7, line 23, "receiving" should read -- recurring --; line 39, "0.4" should read -- 0.04 --. Column 8, lines 2 to 8, the left-hand portion of the formula reading Signed and sealed this 26th day of August 1969.

(SEAL)
Attest:

Edward M. Fletcher, Jr.
Attesting Officer

WILLIAM E. SCHUYLER, JR.
Commissioner of Patents